United States Patent
Lewin et al.

(10) Patent No.: US 11,476,665 B2
(45) Date of Patent: Oct. 18, 2022

(54) MITIGATION OF POWER OUTAGES

(71) Applicant: Hygge Power, Inc., Boulder, CO (US)

(72) Inventors: Maxwell Lewin, Boulder, CO (US);
Caleb Scalf, Boulder, CO (US);
Brandon Verkamp, Loveland, CO (US); Kaushal Malaviya, Boulder, CO (US)

(73) Assignee: Hygge Power Inc., Boulder, CO (US)

( * ) Notice: Subject to any disclaimer, the term of this patent is extended or adjusted under 35 U.S.C. 154(b) by 92 days.

(21) Appl. No.: 16/995,826

(22) Filed: Aug. 18, 2020

(65) Prior Publication Data

US 2022/0060017 A1 Feb. 24, 2022

(51) Int. Cl.
*H02J 3/00* (2006.01)
*H02J 13/00* (2006.01)
*G05B 19/042* (2006.01)

(52) U.S. Cl.
CPC ............ *H02J 3/001* (2020.01); *G05B 19/042* (2013.01); *H02J 13/00002* (2020.01); *H02J 13/00022* (2020.01); *G05B 2219/2639* (2013.01)

(58) Field of Classification Search
CPC ................. H02J 3/001; H02J 13/00002; H02J 13/00022; G05B 19/042; G05B 2219/2639
See application file for complete search history.

(56) References Cited

U.S. PATENT DOCUMENTS

| | | | |
|---|---|---|---|
| 7,429,806 B2 | 9/2008 | Bainbridge et al. | |
| 7,519,909 B2 | 4/2009 | Kuiawa et al. | |
| 7,961,111 B2 | 6/2011 | Tinaphong et al. | |
| 8,412,387 B2 | 4/2013 | Park et al. | |
| 8,417,391 B1* | 4/2013 | Rombouts | G05B 13/02 700/297 |
| 8,674,823 B1 | 3/2014 | Contario et al. | |
| 8,754,544 B2 | 6/2014 | Colombi et al. | |
| 9,432,159 B2 | 8/2016 | Ratasuk et al. | |
| 9,684,349 B2 | 6/2017 | Fallon et al. | |
| 9,703,342 B2 | 7/2017 | Nicholson et al. | |
| 9,769,948 B2 | 9/2017 | Welch, Jr. | |
| 9,929,591 B2 | 3/2018 | Cheng et al. | |
| 9,940,801 B2 | 4/2018 | Phillips | |
| 10,097,034 B2 | 10/2018 | Hsieh et al. | |
| 10,432,017 B1 | 10/2019 | Morales et al. | |

(Continued)

FOREIGN PATENT DOCUMENTS

WO 1994001908 A1 1/1994

OTHER PUBLICATIONS

International Search Report and Written Opinion of Application No. PCT/US2021/046579, dated Dec. 3, 2021 (15 pages).

*Primary Examiner* — Ramesh B Patel
(74) *Attorney, Agent, or Firm* — VLP Law Group LLP; Michel Bohn

(57) ABSTRACT

Technology for mitigating impact of a power outage includes a method that determines power regulation data and identifies a power interruption event. The power interruption event is determined to disrupt operation of an electronic device powered by a grid power supply based on the power regulation data. The method mitigates the identified power interruption event by causing an electronic power supply device to transition from receiving power from the grid power supply to receive power from a local power supply where the electronic device is electrically coupled to the electronic power supply device.

21 Claims, 13 Drawing Sheets

(56) References Cited

U.S. PATENT DOCUMENTS

| | | |
|---|---|---|
| 2003/0033548 A1 | 2/2003 | Kuiawa et al. |
| 2008/0039989 A1 | 2/2008 | Pollack et al. |
| 2011/0025556 A1 | 2/2011 | Bridges et al. |
| 2011/0106321 A1* | 5/2011 | Cherian ............ H02J 13/00017 700/286 |
| 2011/0196547 A1 | 8/2011 | Park et al. |
| 2011/0204720 A1 | 8/2011 | Ruiz et al. |
| 2013/0049466 A1 | 2/2013 | Adams |
| 2013/0191052 A1 | 7/2013 | Fernandez et al. |
| 2013/0274933 A1* | 10/2013 | Kelly ....................... G05F 3/04 700/286 |
| 2014/0070756 A1* | 3/2014 | Kearns .............. H02J 13/00034 320/101 |
| 2014/0266669 A1 | 9/2014 | Fadell et al. |
| 2015/0318705 A1* | 11/2015 | Lucas .................... H02J 3/383 307/129 |
| 2016/0172902 A1 | 6/2016 | Battat et al. |
| 2016/0329710 A1 | 11/2016 | Clifton |
| 2017/0139466 A1 | 5/2017 | Grimes et al. |
| 2017/0177066 A1 | 6/2017 | Linder et al. |
| 2017/0229869 A1* | 8/2017 | Boone ....................... H02J 3/28 |
| 2017/0322578 A1 | 11/2017 | Baone et al. |
| 2019/0013672 A1* | 1/2019 | McDaniel ................. G05F 1/66 |
| 2019/0052083 A1* | 2/2019 | Lucas, Jr. .......... H02J 13/00002 |
| 2019/0258212 A1* | 8/2019 | Morton ..................... H02J 3/38 |
| 2020/0153274 A1* | 5/2020 | Münz et al. ...... H02J 13/00007 |
| 2021/0135890 A1* | 5/2021 | Arduini ................... G05B 9/02 |
| 2021/0234398 A1* | 7/2021 | Morton .................... H02J 3/32 |

\* cited by examiner

MITIGATION OF POWER OUTAGES

TECHNICAL FIELD

The present disclosure generally relates to power regulation and, more particularly, to predicting and mitigating power outages.

BACKGROUND

Consumers are becoming increasingly reliant on electronic devices and appliances. Consumers generally need these electronic devices to be powered by reliable and constant, and increasingly clean, sources of power. However, grid power systems often provide power from sources that are inefficient and pollutive, and occasionally experience power outages or other power interruption events that may cause significant disruption or damage to many consumer electronic devices.

In some cases, power outages and other power interruption events are often difficult to reliably predict based on predicted weather because the severity and specific location of the storms can vary widely. Further, other natural events, such as earthquakes, can cause significant disruptions to power systems with little forewarning. In some cases, to preemptively prevent damage to devices and homes, power companies may shut down the power before a large storm. In other cases, power companies have regulated power to keep up with above-capacity demand.

Further, grid power sources are generally becoming more and more diverse as power is increasingly delivered from a variety of sources, such as fossil fuel, solar, wind, geothermal, hydroelectric, etc. Some of these sources generate more power at some times than at others. For instance, solar power generation is typically maximized during the day, and wind power is maximized when wind speeds are within a specified range. These sources of power may, therefore, be intermittent, and sole reliance on such power sources may result in power outages. In order to transition to a zero emissions grid, the addition of more renewable sources will be important, as well as phasing-out of more reliable sources like coal, so the problem of intermittency will only become worse over time and as we attempt to solve the climate crisis.

To prevent interruptions in power supply, consumers may purchase supplemental power storage in the form of batteries and power generators. Such approaches, however, are often insufficient to meet growing demands for reliable power supplies. Moreover, batteries capable of powering a house (e.g., an all-home battery) or portable power generators can be extremely expensive and provide little or no economic benefit beyond ensuring that a power supply is not interrupted for a limited period of time. Further, all-home batteries may provide little user benefit beyond economic return on investment and backup power functionality.

Further, while some power management systems (e.g., smart home systems) may implement features related to more efficiently utilizing select power-consuming resources, these systems are also expensive, and typically require installation by a professional electrician. Moreover, these systems generally do not protect against power outages and other power interruption events. Finally, these systems often involve significant upgrades of devices throughout a home in order to have a fully integrated network of devices capable of communicating with one another, which also increases costs associated with implementing a fully operational system. As a result, these systems are often limited to wealthy individuals and households.

Additionally, many individuals live in apartments or other housing units in which power is shared across multiple units. For example, many apartment owners have no access to power breakers or other power management units. As a result, many individuals are excluded altogether from a variety of conventional devices geared toward boosting power efficiency as well as preventing interruptions in the power supply.

Accordingly, there is a need for a supplemental power supply that protects against power interruption events in addition to providing a way for individuals to manage power consumption of one or more devices. There is also a need for systems and devices that can be installed and/or implemented without requiring extensive knowledge of electrical systems and which can provide some or all of the above-benefits to typical consumers (in a variety of housing situations) at a reasonable price. Further, there is a need for systems and devices that can address some of the above problems for an increasingly diverse set of electrically powered devices, such as computers, televisions, modems/routers, Internet of Things (IoT) devices, and other electronic devices.

SUMMARY

Various aspects for mitigating power outages and related effects are described.

One general aspect includes a computer-implemented method, that includes determining power regulation data; identifying a power interruption event determined to disrupt operation of an electronic device powered by a grid power supply based on the power regulation data; and mitigating the identified power interruption event by causing an electronic power supply device to transition from receiving power from the grid power supply to receiving power from a local power supply, the electronic device being electrically coupled to the electronic power supply device.

In one implementation, the power regulation data includes historical power generation information; and the method further comprises: receiving the historical power generation information; monitoring a state associated with the electronic power supply device; and identifying the power interruption event including predicting the power interruption event based on the historical power generation information and the monitored state associated with the electronic power supply device. In another implementation, identifying the power interruption event includes: performing a comparison between the power regulation data and one or more event prediction criteria and determining the power interruption event based on the comparison; or predicting, using machine learning logic, the power interruption event based on one or more features included in the power regulation data.

In yet another implementation, the power regulation data includes one or more of: household information reflecting a condition of an electrical infrastructure of a household to which the electronic power supply device is electrically coupled; weather information for a location associated with the grid power supply; grid infrastructure state information reflecting an infrastructure state of the grid power supply; and third-party information reflecting one or more of grid power pricing data and vegetation management data. Further, determining the power regulation data includes receiving the power regulation data from a remote server via a network.

In a further implementation, determining the power regulation data includes generating a variation signal in response to detecting a signal variation in the grid power supply; and identifying the power interruption event comprises: determining that the variation signal satisfies a predetermined threshold; and determining the power interruption event to be an excessive signal variation.

In a yet further implementation, the computer-implemented method further includes receiving, via a network from a computing device of a user, an electronic power supply device configuration for setting a parameter instructing a controller of the electronic power supply device to transition to the local power supply if a predetermined threshold is satisfied; and storing, in a memory of the electronic power supply device, the electronic power supply device configuration. Further, the electronic power supply device configuration comprises a user-defined power transition schedule.

In another implementation, the computer-implemented method further includes preemptively charging, prior to an occurrence of the identified power interruption event, the local power supply of the electronic power supply device to a level sufficient to power one or more apparatuses electrically coupled to the electronic power supply device for one of a user-configured period of time or a period of time estimated as needed to restore the grid power supply. Further, the causing the electronic power supply device to transition includes switching a relay to switch the electronic power supply device from receiving the power from the grid power supply to receiving the power from the local power supply.

Another general aspect includes a system, comprising: a memory including executable instructions; and a processor configured to execute the executable instructions to cause the system to: determine power regulation data; identify a power interruption event determined to disrupt operation of an electronic device powered by a grid power supply based on the power regulation data; and mitigate the identified power interruption event by causing an electronic power supply device to transition from receiving power from the grid power supply to receiving power from a local power supply, the electronic device being electrically coupled to the electronic power supply device.

In one aspect, the power regulation data includes historical power generation information; and the system is further configured to: receive the historical power generation information; monitor a state associated with the electronic power supply device; and identify the power interruption event includes predicting the power interruption event based on the historical power generation information and the monitored state associated with the electronic power supply device.

In another aspect, to identify the power interruption event includes the processor configured to: perform a comparison between the power regulation data and one or more event prediction criteria and determining the power interruption event based on the comparison; or predict, using machine learning logic, the power interruption event based on one or more features included in the power regulation data. Further, the power regulation data includes one or more of: household information reflecting a condition of an electrical infrastructure of a household to which the electronic power supply device is electrically coupled; weather information for a location associated with the grid power supply; grid infrastructure state information reflecting an infrastructure state of the grid power supply; and third-party information reflecting one or more of grid power pricing data and vegetation management data. Further, to determine the power regulation data includes to receive the power regulation data from a remote server via a network.

In another aspect, the processor is configured to: determine the power regulation data includes generating a variation signal in response to detecting a variation in the grid power supply; and identify the power interruption event comprises: determine that the variation signal satisfies a predetermined threshold; and determine the power interruption event to be an excessive signal variation.

In another aspect, the processor is further configured to: receive, via a network from a computing device of a user, an electronic power supply device configuration for setting a parameter instructing a controller of the electronic power supply device to transition to the local power supply if a predetermined threshold is satisfied; and store, in a memory of the electronic power supply device, the electronic power supply device configuration. Further, the electronic power supply device configuration comprises a user-defined power transition schedule.

In another aspect, the processor is further configured to: preemptively charge, prior to an occurrence of the identified power interruption event, the local power supply of the electronic power supply device to a level sufficient to power one or more apparatuses electrically coupled to the electronic power supply device for one of a user-configured period of time or a period of time estimated as needed to restore the grid power supply. Further, to cause the electronic power supply device to transition includes to switch a relay to switch the electronic power supply device from receiving the power from the grid power supply to receiving the power from the local power supply.

A further general aspect includes a system comprising: means for determining power regulation data; means for identifying a power interruption event determined to disrupt operation of an electronic device powered by a grid power supply based on the power regulation data; and means for mitigating the identified power interruption event by causing an electronic power supply device to transition from receiving power from the grid power supply to receiving power from a local power supply, the electronic device being electrically coupled to the electronic power supply device.

The technology disclosed herein is advantageous in a number of respects. For instance, it can perform a variety of preparatory actions, such as alerting a user of the upcoming event, charge a home battery, or other actions to prepare for and mitigate the negative effects of power interruption events. In some examples, sensor(s) at a power supply (e.g., power supplied from the grid) may sense a sudden drop in voltage which may indicate a power outage. When the sensor detects the drop in voltage, a home battery may switch power from the power supply to battery power without or with minimal interruption in service.

Further, the technology can beneficially manage power consumption of home power storage systems and electronic devices on a fine granular level and includes features for collecting information about power utilization at a sub-unit level and/or at an individual device level. For instance, the technology may collect power usage, time of use, duration of use, and other information on a sub-unit of a grid level (e.g., an apartment, a floor of a building, a house), an outlet level, or another level that provides granular detail beyond what a power meter provides.

The technology can also boost the efficiency of power utilization for individuals as well as energy companies and can modify typical utilization patterns of devices in various ways. For example, the technology can communicate with power suppliers and consumers to coordinate non-essential (e.g., charging of electronic devices, charging of batteries) power usage to periods of low demand, which can beneficially diminish the impact of power interruption events as well as significantly reduce individual energy costs for consumers.

It should be understood, however, that this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
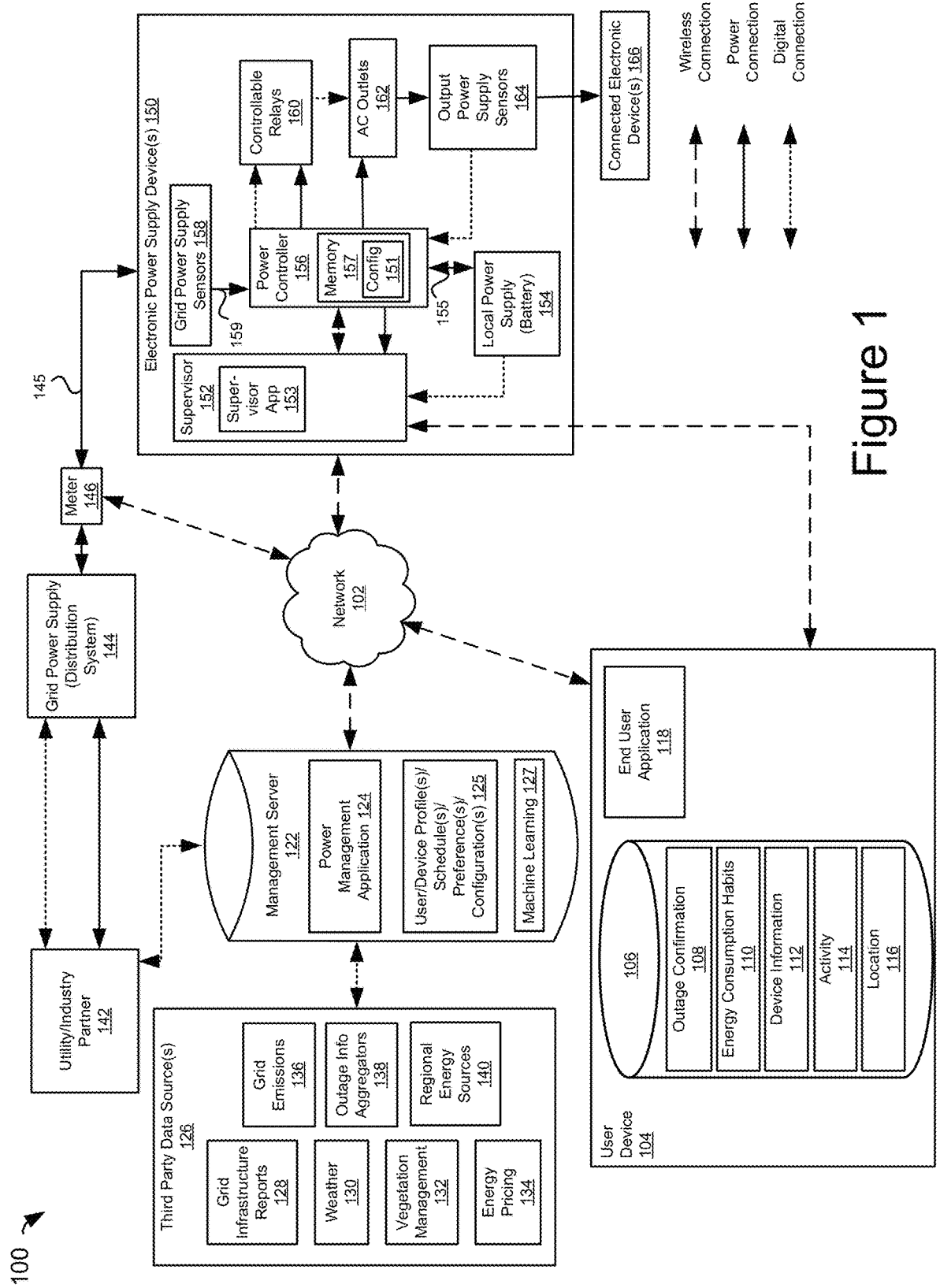
FIG. 1 schematically illustrates an example power outage mitigation system.

Novel technology is disclosed that allows an on-premises (e.g., home) energy system to predict and mitigate power interrupting events (e.g., power outages, power surges). Prediction and mitigation can reduce and limit the disruption to the lives of individuals and businesses in the event of a power outage (or other power interruption events) by ensuring that critical electronic devices have a reliable power source, notifying the user of potential outages ahead of time, and providing tools for them to plan around outage risks.

The technology can employ a variety of ways to predict power interrupting events. For instance, the technology may receive data from power suppliers, other customers, weather forecasters, climate records, and any other suitable sources to determine power outage risks and predict upcoming power interruption events, and may perform a variety of actions, such as alerting a user of the upcoming event, charging a home battery, or other actions to prepare for and mitigate negative effects of power interruption events. In a further example, a power supply sensor may sense a sudden drop in voltage which may indicate a power outage. When the sensor detects the drop in voltage, the technology may switch power from the power supply to battery power without or with minimal interruption in service.

The technology can also provide features related to managing power consumption of home power storage systems and electronic devices on a fine granular level. In one aspect, the technology may include software and hardware aspects configured to collect information about power utilization at a sub-unit level and/or at an individual device level. For instance, the technology may collect power usage, time of use, duration of use, and other information on a sub-unit of a grid level (e.g., an apartment, a floor of a building, a house), an outlet level, or another level.

In addition to providing useful information at varying levels of granularity, the technology may manage the consumption of power of particular devices to boost the efficiency of power utilization for individuals as well as energy companies. For instance, the technology may modify typical utilization patterns of devices in a variety of ways. In another aspect, the systems and methods may communicate with power suppliers and consumers to coordinate non-essential (e.g., charging of electronic devices, charging of batteries) power usage to periods of low demand. Similar to aspects mentioned above, this may diminish the impact of power interruption events as well as significantly reduce individual energy costs for consumers.

In some implementations, the technology may be implemented in various forms, sizes, and complexity, such as a plug, a hub, and a stack, which may be differentiated in scale and battery capacity. By way of example, the plug may be the smallest and may fit over a standard duplex outlet. The plug may have limited battery capacity and is primarily intended to provide supplemental power for personal electronic devices. Also by way of example, the hub may be larger, and, in addition to smaller electronic devices, may provide supplemental power to computers, wireless routers, small appliances, and other medium-sized electronic devices. Further by way of example, the stack has the largest battery, and, in addition to the devices powered by the plug and the hub, is capable of powering appliances, such as a refrigerator, range and oven, laundry machines, and other appliances. The devices receive inputs from the cloud and/or a user's mobile app. This may cause the device to change a relay on a power outlet, thereby shutting a plugged-in device or appliance off.

FIG. 1 schematically illustrates a power outage prediction and mitigation system. A system 100 is illustrated including power and digital control connections (control and status channels), and wireless connections or channels. The various connections are illustrated in FIG. 1 using differently dashed and solid lines representative of the differing connections. The different elements of system 100 may also be coupled together via a network 102 may be configured as a wide area network (WAN), a local area network (LAN), or other networks. The network 102 may couple together various elements including one or more electronic power supply devices 150, a management server 122, and a user device 104.

The electronic power supply device 150 provides an electrical connection for connected electronic device(s) 166.

The connected electronic device(s) 166 may include electrical and electronic components. The electronic power supply device 150 includes a supervisor 152 which may be configured as a processor that provides instructions to a power controller 156. Power controller 156 may be configured to be coupled to provide power to the connected electronic device(s) 166 whether from an external power supply, such as an input grid power supply 145, or from a local power supply, such as local power supply 154.

Electronic power supply device 150 may also include grid power supply sensors 158 which monitor the input grid power supply to detect fluctuations that may be indicative of a grid power supply impending outage and generate a variation signal 159. The variation signal may be indicative of variations in voltage, current, frequency, power factor, and other signal characteristics. Variations in such power characteristics may result in the different mitigation efforts. For example, when a grid power supply is operating at or near capacity, the frequency of the input grid power supply 145 may vary outside of a normal range. Such detected variations may be indicative of imminent disruption to the input grid power supply 145. In another example, the power factor is a measurement of the phase relationship of the voltage and current waveforms of the input grid power supply 145. Such insight may indicate when different types of loads (e.g., batteries) may or should be activated to better balance the loads.

In response to information, such as the variation signal 159, from the grid power supply sensors 158, the power controller 156 may control controllable relays 160 which may provide power to AC outlets 162. The power provided to the AC outlets 162 may be power from one of the input grid power supply or local power supply 154. Electronic power supply device 150 may also include output power supply sensors 164 for monitoring power provided to the connected electronic device(s) 166. Further, the output power supply sensors 164 may monitor changes or variations in voltage, frequency, current, or other signal characteristics. Similarly, the output power supply sensors 164 may also monitor changes or variations in voltage, frequency, current, or other signal characteristics.

Supervisor 152 may also receive data or information from a user device 104 or a cloud-based entity such as management server 122 or another electronic power supply device 150. Such information may be used to perform various power management functions such as for mitigation of power interruption or for boosting energy efficiency. The supervisor 152 may receive information via a wired connection or a wireless connection to network 102. For example, the supervisor 152 may connect to the network 102 (e.g., the Internet) or a user device through a wireless (e.g., Wi-Fi) network. The supervisor 152 may connect to a user device 104 through a short-range wireless connection, such as a Bluetooth connection. A data connection (e.g., wireless, wired, etc.) allows the supervisor 152 to receive instructions from the cloud-based service, such as the management server 122, and/or from a mobile device, such as user device 104, both of which can be used in performing various power management actions.

User device 104 may include a user application 118. The user application 118 may support a user interface for interaction with the electronic power supply device 150. In operation, the supervisor 152 may transmit information to the user application 118 including data from the grid power supply sensors 158, the status of the change of local power supply 154, and the status of controllable relays 160. The supervisor 152 and/or the user application 118 may provide analysis of this information using processes 106, including information about power interrupting events (e.g., outages, surges) using an outage confirmation process 108, energy consumption habits process 110, and activity patterns of plugged-in devices, such as connected electronic device(s) 166. The user may further provide information with consent to the supervisor 152 through the application 118, including location information 116, history of movement pattern or activity information 114, plugged-in device/charging preferences information 112.

User application 118 may further communicate with a cloud-based management server 122 including a power management application 124. The management server 122 may receive information from utility/industry partner 142 which may be a power utility company. The management server 122 may receive information such as total home power usage, locational power interrupting event information, including scheduled outages, and energy pricing information. The management server 122 may provide data analytics to the utility/industry partner 142, including reporting of outages, power usage analytics, customer feedback, and capacity information.

The management server 122 may further collect information from third parties, including grid infrastructure reports 128, weather (reports) data 130, reports of vegetation management data 132, energy pricing data 134, grid emissions 136, outage information aggregators 138, and regional energy sources 140. The management server 122 may process this information to predict power interrupting events, report information to users at user device 104, and report information to the utility/industry partner 142.

In some examples, the prediction and mitigation system 100 may mitigate a power interrupting event. A power interrupting event may be any event that disrupts the supply of power to electronic devices, such as connected electronic device(s) 166. Such events may include power outages, power surges, inrush current losses, and so forth. Electronic power supply device 150 mitigates power interrupting events by switching the power provide to the connected electronic device(s) 166 from grid power 145 to local power 155.

In some examples, the supervisor 152 and/or the power controller 156 may detect a power interrupting event by detecting a change in input voltage detected by the grid power supply sensors 158. For example, a sudden decrease in voltage may indicate a power outage. In the event of a power outage, the controller 156 may switch from grid power 145 from the grid power supply 144 to local power from the local power supply 154. This may help a user to continue using critical electronic devices 166, including appliances during a power outage. In some examples, a sudden increase in input voltage from the grid power supply 144 may indicate a power surge. In the event of a power surge, the supervisor 152 and/or power controller 156 may switch from the grid power supply 144 to the local power supply 154. This may serve to prevent damage to electronic devices, or simply reduce costs associated with using grid power during a power surge period for an electronic device (e.g., a fridge upon connecting to the grid).

In some examples, the supervisor 152 and/or the power controller 156 may switch from grid power 145 to local power 155 without a noticeable interruption in power supply at the outlets. For instance, the supervisor 152 and/or the power controller 156 may detect an unexpected power surge in the grid power 145. Before a plugged-in electronic device turns off from lack of power (e.g., a light turns off), the supervisor 152 and/or the power controller 156 may switch from grid power 145 to local power 155. Thus, a power interrupting event may be mitigated by providing an uninterrupted power supply to the outlet 162.

In some examples using the supervisor 152 and/or the power controller 156, inrush current is detected and offset by the battery energy stored in the device, reducing the inrush current observed by the grid. This consists of three phases, detection, supply, and disconnection. Detection occurs when current sensors detect a high rate of current draw through the system. After it's detected that a high inrush current event is occurring, the supervisor's and/or the controller's power supply is initiated. Using the energy stored in the batteries, power is supplied to supplement or supplant power drawn from the grid, thereby reducing the amount of power the grid power supply 144 needs to supply. After the inrush current has been supplied, the supervisor and/or the controller determines that the inrush current event is over. The local power supply 154 may then be disconnected, allowing the grid power supply to continuously power the now stable electronic device(s).

Another use of the auto inrush modulation when the electronic power supply device 150 is connected to a load (e.g., electronic device(s)) with a higher inrush current than a DC-AC inverter and batteries of the local power supply 154 can handle, and it is desirable to run the load off of the local power supply 154. This desire could come from demand response programs. For example, where less energy is delivered to a home or business, the energy provider may offer a monetary bonus. In this case, where the inrush current is beyond the capabilities of the inverter, but the continuous load is within, load shifting may still occur using the supervisor's and/or the controller's inrush current modulation features. In this case, there are three phases: detection, delay, and supply. In a detection phase, the supervisor and/or the controller detects the high inrush current event and analyzes the characteristics of the current waveform. In the delay phase, the system is waiting for the inrush current event to complete and for nominal/continuous load to settle. In the supply phase, the system begins supplying energy to meet the continuous load of the device. Using these techniques, the supervisor and/or the controller can load shift a high inrush current device if the continuous load is within the local power supply's inverter limits.

The management server 122 and/or the supervisor 152 may also predict that a power interrupting event will occur at a specified time or within a specified time range. To prevent an interruption in power supply to the outlet 162, the supervisor 152 and/or the power controller 156 may switch power from grid power 145 to local power 155. This may prevent the user from experiencing an interruption due to a power interrupting event.

As discussed herein, the electronic power supply device 150 may be configured using electronic power supply device configuration 151 to have different capacities. By way of example, the electronic power supply device 150 may be configured as one of a first device (e.g., a "plug") used to power small electronic devices. The electronic power supply device 150 may be configured as a second device (e.g., "hub") used to power electronic devices such as computers, televisions, lights, in addition to small electronic devices. The electronic power supply device 150 may also be configured as a third device (e.g., "stack") configured to power some appliances and other electronic devices. Each of various configurations of the devices plug into a standard outlet.

As discussed above, management server 122 collects and analyzes data from many sources to help mitigate power interrupting events, predict power interrupting events, manage plugged-in electronic devices, and perform other tasks. Management server 122 collects power usage information from both the meter 146, which is an indication of total home power usage, as well as individual device information. This information helps provide management server 122 with greater detail regarding home power usage. In this manner, management server 122 may determine which devices should be turned on, turned off, and when a local power supply (e.g., battery) should be charged. This information may also be used in predicting power interruption events.

The electronic power supply devices 150 may be plugged into a wall outlet. The power coming into the device from the plug may be representative of the power received from the power supplier (e.g., the grid). The device may track fluctuations in the incoming power, which may be used to predict or determine a power interrupting event. In some embodiments, the supervisor 152 and/or the management server 122 may analyze regular or repeated fluctuations for patterns, and may predict power interrupting events based on correlations between the fluctuations and other collected data. These devices 150 may be provided at different points at each end-user location, and the data from multiple devices (which may be located at different end-user locations) may be combined for analysis. This data can be used in conjunction with analytic tools to predict equipment maintenance and failure. For example, the data may be used to predict or prevent transient disruptions (e.g., changes to peak power), interruptions, undervoltages, overvoltages, waveform disruptions voltage fluctuations, and frequency variations.

Using predictive analytics, such as machine learning models 127, the management server 122 may detect problems and predict the source of problems (e.g., locating the problem at a specific piece of equipment). For example, locating multiple devices at an end-user location may enable the system to differentiate between problems with equipment at the end-user location (e.g., beyond the meter) from transmission or distribution equipment such as a faulty transformer. The precise nature of the waveform capture may be used by the predictive model to differentiate between different types of failure (including what kind of equipment is failing and at what stage and location). In some cases, the result of the predictive analytics may be used to perform preventative maintenance or repairs.

In some examples, the data from the monitoring devices, such as electronic power supply devices 150, may be combined with information about specific equipment that forms the grid, as well as a graph or map of the locations of specific equipment. In some examples, the monitoring device, such as electronic power supply devices 150, may be located in conjunction with (or may be integrated into) an uninterrupted power supply (UPS) device that protects against power disturbances. That is, a monitoring device, such as electronic power supply devices 150, may be combined with systems that enable end-user equipment to be operated normally if there is a disturbance at some part of the power grid. Therefore, the systems and methods described can provide a more efficient means of measuring the electric waveform at an end-user location, which may enable operators of various parts of the power grid (e.g., utilities and power distributors) to more efficiently make repairs, perform maintenance, and otherwise prevent and respond to power disruptions.

The supervisor 152 may collect power usage information about individual electronic devices 166 and/or appliances using the grid power supply sensors 158. The supervisor 152 and/or the management server 122 may analyze the usage data and determine patterns based on other data. For example, the user device 104 may include location tracking features. The user device may share the location with the end-user application 118 and the power management application 124. The supervisor 152 and/or the management server 122 may analyze patterns of energy usage based on where the user device 104 is located. For example, the analysis may determine that a user uses electronic devices 166 more often when they are at home. The supervisor 152 and/or the management server 122 may share this information with the user or with other parties to help tailor power usage to the user's preferences and activities. When an electronic device 166 (e.g., a TV) is being turned on while the location indicates that the user is out of home, the end-user application 118 and/or management server 122 may inform the user of suggestions to turn off the device.

The end-user application 118 and/or management server 122 may further use the collected information to predict power interrupting events, such as power outages and power surges. As an example, historical power outage data may indicate that the power utility preemptively shuts power off to prevent creating wildfires from downed power lines. Weather data may indicate that the fire danger is increased when it is hot, dry, and windy. Therefore, when the weather is hot, dry, and windy, the management server 122 may predict that a power outage will occur. The management server 122 may further predict the length of the power outage by analyzing previous outages and their associated conditions. Predicting the time and duration of a power outage may be used to help an individual system prepare for the outage. For example, a user may ensure that supplemental power systems such as local power supply 154 (e.g., batteries) are charged. Charged local power supplies may allow the user to continue to use electronic devices throughout the power interrupting event. In this manner, a power interrupting event does not need to be as disruptive.

Figure 2:
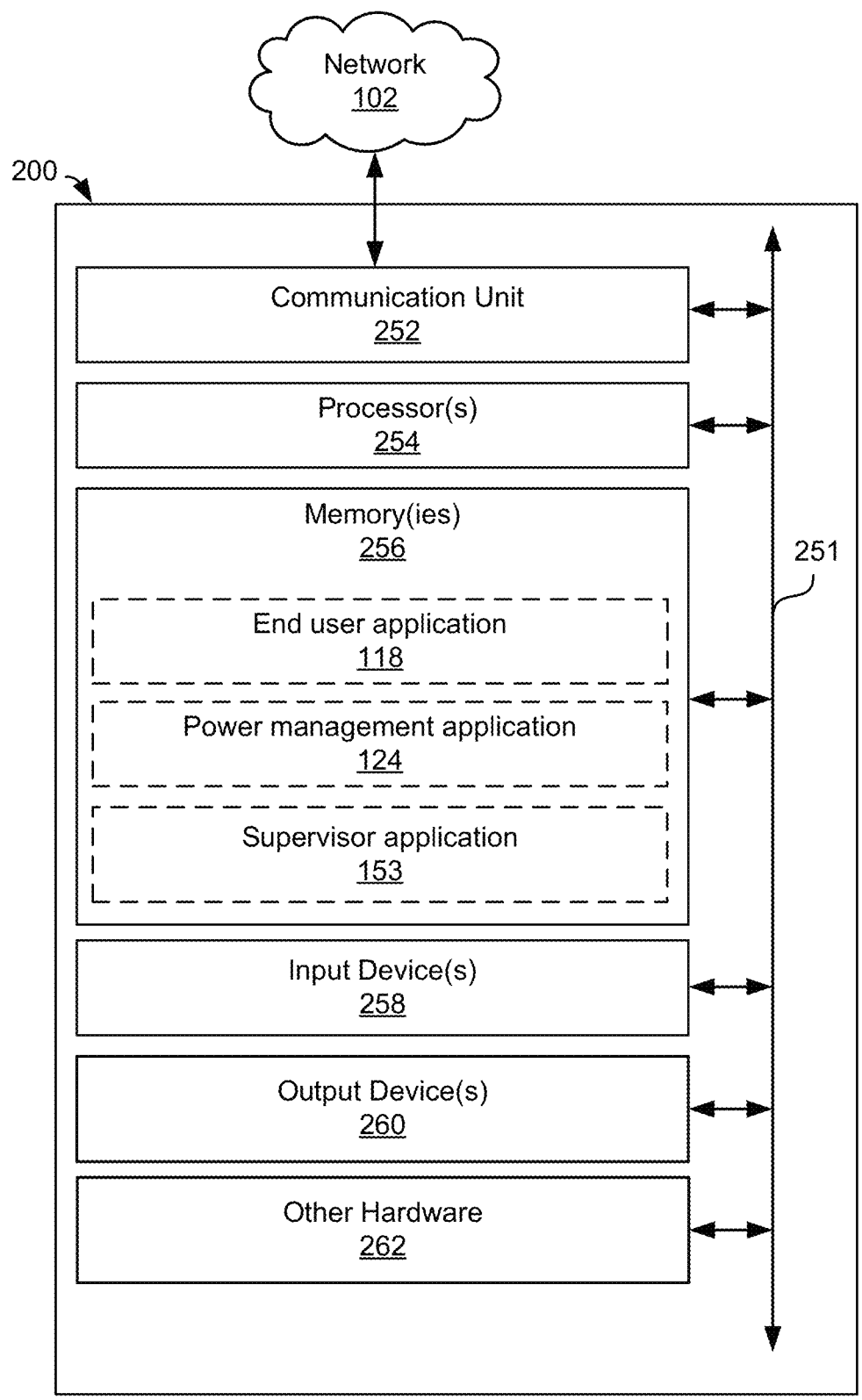
FIG. 2 schematically illustrates an example computing device.

FIG. 2 schematically illustrates an example computing device 200. The device 200 may be configured as one of a management server 122, an electronic power supply device 150, and a user device 104. Each of the variously configured devices may communicate with a network 102. The network 102 may be a wide area network, a local area network, or other network configurations. Each of the differently configurable devices 200 may include various blocks described herein which communicate over a bus 251. Each of the differently configurable devices 200 may include a communication unit 252 configured for communicating with network 102 over a communication channel. The communication channel may be a wired or wireless channel configured to operate according to known or proprietary communication standards.

Each of the variously configured devices 200 may also include a controller or processor 254 and a memory 256. A processor 254 may comprise one or more processing units and may execute software instructions, such as the operations, acts, and functions described herein, by performing various input, logical, and/or mathematical operations. For example, operations performed by a computing device including "processing," "computing," "retrieving," "calculating," "determining," "displaying," or others identified in the methods described herein, may refer to the action and processes of the computing device 200, or similar electronic computing device, that manipulates and transforms data represented as physical (electronic) quantities within the computer system's registers and memories into other data similarly represented as physical quantities within the computer system memories or registers or other such information storage, transmission or display devices.

In some implementations, a processor 254 may be capable of generating and providing electronic display signals to a display device, supporting the display of images, capturing and transmitting images, performing complex tasks including various types of feature extraction and sampling, embody a hardware and/or software controller, etc. In some implementations, the processor 254 may be coupled to the memory 256 via the bus 251 to access data and instructions therefrom and store data therein. The bus 251 may couple the processor 254 to the other components of the computing device 200 including, for example, the communication unit 252, the memory 256, the input device(s) 258, the output device(s) 260, and/or any other components, such as other suitable components and/or computing systems.

A memory 256 may include one or more non-transitory computer-usable (e.g., readable, writeable, etc.) media, which may be any non-transitory apparatus(es) or device(s) that can contain, store, communicate, propagate or transport instructions, data, computer programs, software, code, routines, etc., for processing by or in connection with the processor 254. In some implementations, the memory 256 may include one or more of volatile memory and non-volatile memory (e.g., read-only memories (ROMs), random access memories (RAMs), erasable programmable ROMs (EPROMs), electrically erasable programmable ROMs (EEPROMs), flash memories, solid-state memories, hard disks, magnetic or optical cards, optical disks, etc.), or any other type of media suitable for storing electronic instructions and/or data. It should be understood that the memory 256 may be a single device or may include multiple types of devices and configurations.

A memory 256 may store instructions and/or provide access to data to the other components of the computing system 100, such as instructions and/or data that may be executed by the processor 254. For example, one or more memories 156 may store an instance of the power management application 124, user application 118, and/or the supervisor application 153, and their respective components, depending on the configuration. For instance, the memory 256 of a computing device 104 of an end-user may store an instance of the user application 118; the memory 256 of electronic power supply device 150 may store an instance of the supervisor application 153, and the memory 256 of the management server 122 may store an instance of the power management application 124.

A memory 256 is also capable of storing other instructions and data, including, for example, an operating system, hardware drivers, other software applications, databases, files, settings, configurations, firmware, etc. The memory 256 may be coupled to the bus 251 for communication with the processor 254 and the other components of computing device 200.

The differently configurable devices 200 may also include one or more input devices 258 for receiving inputs from a user or other system. The differently configurable devices 200 may also include one or more output devices 260 for displaying or providing output information including control signals to a display or other systems.

The input device(s) 258 may include any device for inputting information into the computing device 200. In some implementations, an input device 258 may include one or more peripheral devices. For example, an input device 258 may include a keyboard, a pointing device, microphone, an image/video capture device (e.g., camera), a capacitive layer associated with a touch-screen display, a button, or any other input device.

The output device(s) 260 may include any device capable of outputting information from the computing device 200. The output device(s) 260 may include one or more of a display (e.g., light-emitting diode (LED) display, organic LED display, liquid-crystal display (LCD), projector, electronic glass display, etc.), a printer, a 3D printer, a haptic device, an audio reproduction device, a touch-screen display, etc. In some implementations, an output device 260 may display images and/or data output by the computing device 200 for presentation to a user. The input device(s) 258 and/or the output device(s) 260 can be coupled to the system either directly or through intervening input/output (I/O) controllers. In some implementations, a processor 254 of a computing device 200 may include a graphics adapter for rendering and outputting the images and data for presentation on the output device 260.

Further, the differently configurable devices 200 may also include other hardware 262. In one example, when the device 200 is configured as an electronic power supply device 150, the other hardware 262 may take the form of controllable relays 160, outlets 162, grid power supply sensors 158, and output power supply sensors 164, as discussed further elsewhere herein. In further examples, the computing device 200 may include various communication ports, such as various physical connection interfaces (e.g., CAT-type, universal serial bus (USB), high-definition multimedia interface (HDMI), etc.), etc.

In one example where the device 200 is configured as a user device 104, the device 200 may further include a user application 118 configured to receive user information through various input devices. The user application 118 may also be configured to receive and process outage information, energy consumption habits, and activity information. The user application 118 may also be configured to provide location information, device information and activity information associated with the user device.

In another example where the device 200 is configured as a management server 122, the device 200 may include a power management application 124. The power management application 124 may process information received from the utility/industry partner 142, and/or third-party data sources 126. The power management application 124 may communicate the process information with an electronic power supply device 150 and/or user device 104.

In yet another example where the device 200 is configured as an electronic power supply device 150, the device 200 may include a supervisor application 153. The supervisor application 153 may perform the various functions described herein with respect to the activities of supervisor 152.

Figure 3:
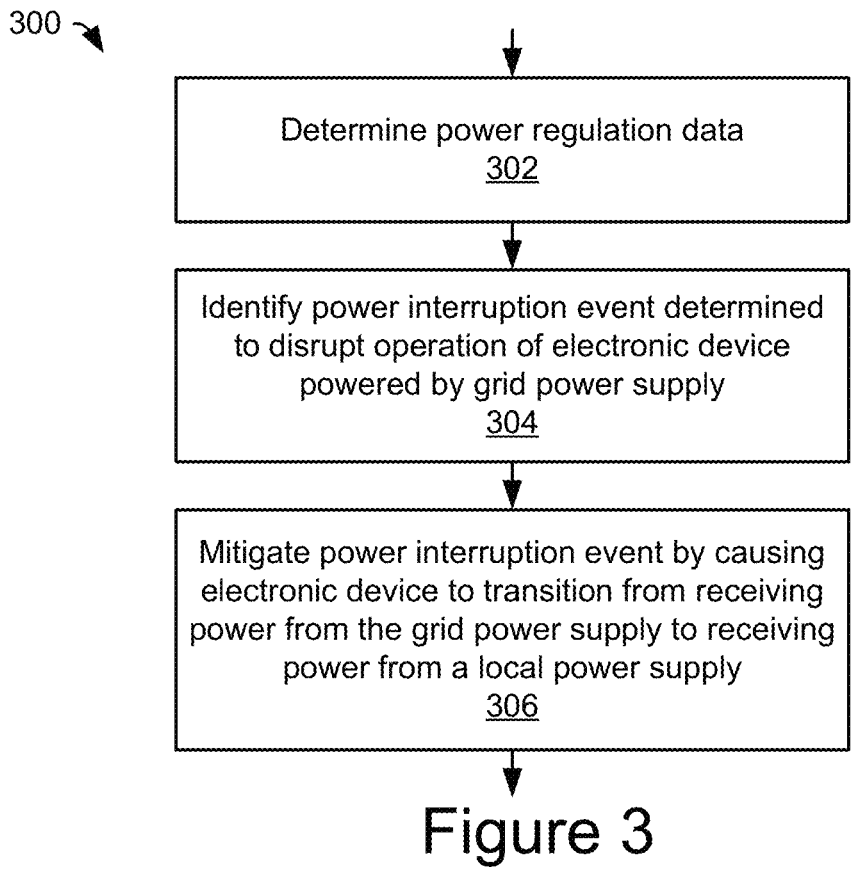
FIG. 3 is a flow diagram illustrating an example method for detecting and mitigating a power interruption event.

FIG. 3 is a flow diagram illustrating an example method 300 for detecting and mitigating a power interruption event. As shown, the method 300 includes operations for analyzing data from many sources to help mitigate power interrupting events.

In block 302, the system 100 determines power regulation data. As described further herein, power regulation data may be gathered or retrieved by management server 122 and may be processed in one or more of the devices including the management server 122, the electronic power supply device 150, or the user device 104. As described, the power regulation data may be provided individually or combined with other data to form the power regulation data. For example, power regulation data may be derived from utility/industry partner 142 and/or from third-party data sources 126. Information received from utility/industry partner 142 may include grid service notifications identifying times and events when the grid power from the grid power supply 144 may be impacted.

Power regulation data from third-party data sources 126 may include grid infrastructure reports 128, current or predicted weather data 130, vegetation management data 132, energy pricing data 134, and data from outage information aggregators 138.

In block 304, the system 100 identifies a power interruption event. As described further herein, the power interruption event may be identified by management server 122 and may be processed in one or more of the devices including the management server 122, the electronic power supply device 150, or the user device 104. For example, the power interruption event may be provided by a utility/industry partner 142, a third-party source 126, or by grid power supply sensors 158. Further, the power interruption event may be provided individually or combined with other data to identify the power interruption event. Yet further, the power interruption event may be any event that disrupts the operation of electronic devices 166.

In block 306, the system 100 mitigates the power interruption event by causing the electronic power supply device 150 to transition from receiving power from the grid power supply to receiving power from the local power supply. The transition may occur through the use of one or more controllable relays 160 as controlled by power controller 156.

Figure 4:
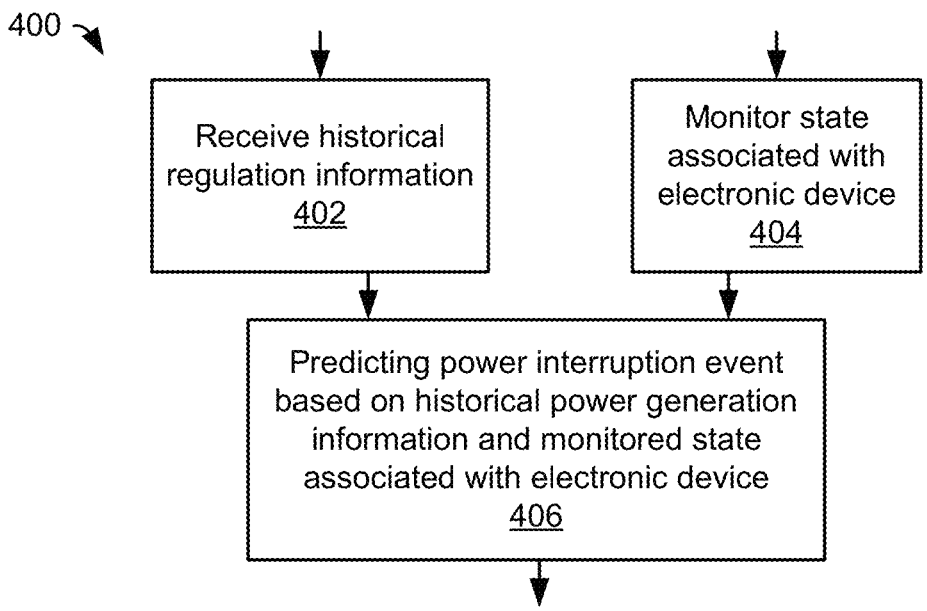
FIG. 4 is a flow diagram illustrating an example method for predicting a power interruption event.

FIG. 4 is a flow diagram illustrating an example method 400 for predicting a power interruption event. In block 402, a device, such as a management server 122, receives historical regulation information. The historical regulation information may be from one of many sources.

In block 404, a device, such as the management server 122, monitors the state associated with an electronic device 166. A state associated with the electronic device may include the state of being "on" or active for the state of being "off" or on standby. Accordingly, the state of an electronic device will determine the power needs of the device.

In block 406, a device, such as management server 122, predicts the power interruption event based on the historical power generation information and the monitored state associated with the electronic device. For electronic devices that are in the "off" or inactive state, prediction of a power interruption event is less important as the electronic device has no immediate power needs. However, for electronic devices that are "on" or active, prediction of a power interruption event provides the opportunity for mitigating power interruption. Outage mitigation may occur by pre-emptively charging, prior to an occurrence of the identified power interruption event, the local power supply of the electronic power supply device to a level sufficient to power one or more apparatuses electrically coupled to the electronic power supply device for one of a user-configured period of time or a period of time estimated as needed to restore the grid power supply.

Figure 5A:
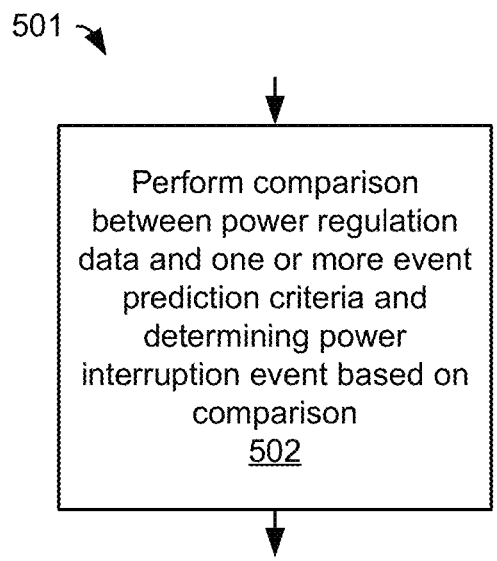
FIG. 5A is a flow diagram illustrating an example method for comparing power regulation data and event prediction criteria.

FIG. 5A is a flow diagram illustrating an example method 501 for comparing power regulation data and event prediction criteria. In block 502, the method 501 may perform a comparison between the power regulation data and one or more event prediction criteria to determine the power interruption event. In one example, the comparison may be based on natural phenomena risks, such as wind, lightning, freezing rain, wildlife, snow, fires, and other disasters. In another example, the comparison may be based on technological risks, such as planned outages, power consumption, tripped or broken equipment, and above/below ground power lines.

In yet another example, the comparison may be based on human risk, such as ongoing construction, vandalism, and cybersecurity breach. The comparison may be based on any of the above factors that are associated with a location that then provides a weighted risk based upon one or more of the above factors.

The comparison may be processed in one or more of the devices including the management server 122, the electronic power supply device 150, or the user device 104. Further, the comparison may be performed individually or combined with other data to identify the power interruption event.

Figure 5B:
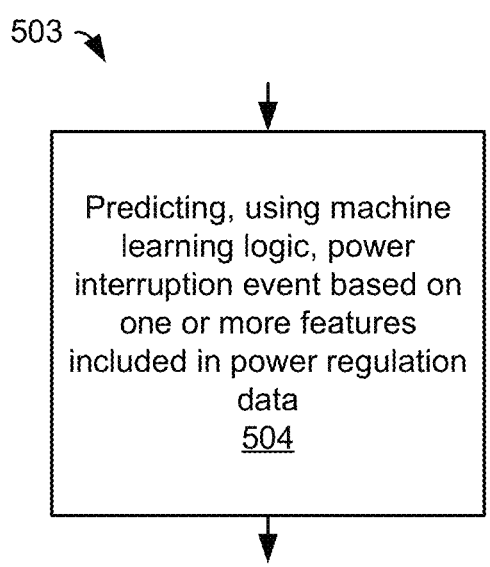
FIG. 5B is a flow diagram illustrating an example method for predicting a power interruption event.

FIG. 5B is a flow diagram illustrating an example method 503 for predicting a power interruption event. In block 504, the method 503 may predict the power interruption event using machine learning logic or models based on one or more features included in the power regulation data. In one example, one of the management servers 122, the electronic power supply device 150, or the user device 104 may predict the power interruption event by weighting one or more of the predictions based on one or more of natural phenomena risks, technological risks, human risks, and historical data. The predictions, while performed in one, may be forwarded to others of the management server 122, the electronic power supply device 150, or the user device 104 for storage and usage.

In some examples, the power regulation data, with respect to the methods 501 and 503, may include one or more of household information reflecting a condition of an electrical infrastructure of a household to which the electronic power supply device is electrically coupled, weather information for a location associated with the grid power supply, grid infrastructure state information relating to an infrastructure state of the grid power supply, and third-party information reflecting one or more of grid power pricing data and vegetation management data. In other examples, determining the power regulation data may include receiving the power regulation data from a remote server via a network.

Figure 6:
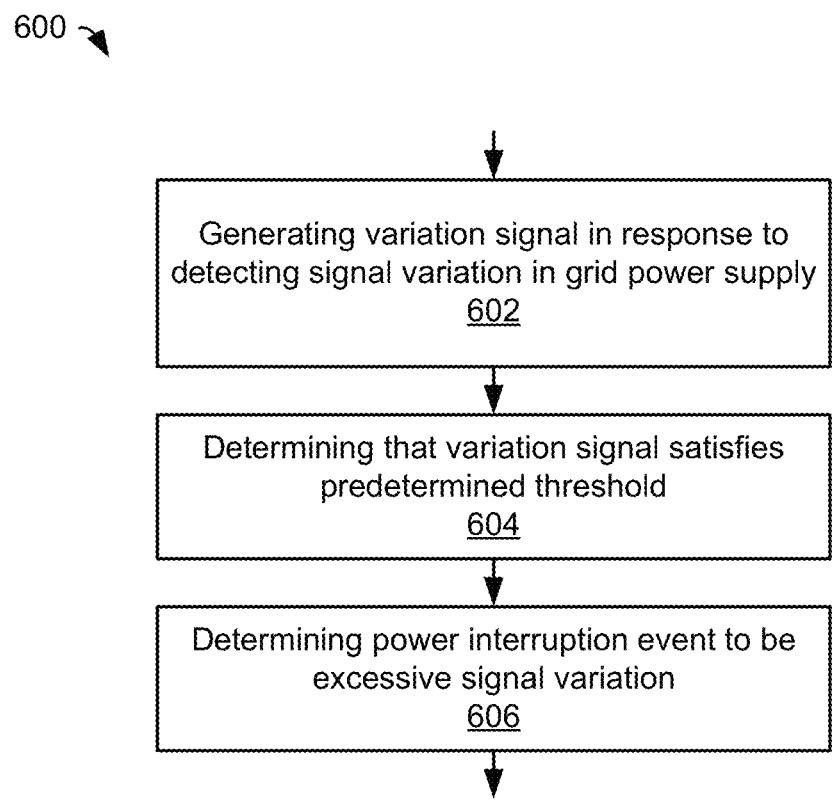
FIG. 6 is a flow diagram illustrating an example method for determining a power interruption event based on detected signal variation.

FIG. 6 is a flow diagram illustrating an example method 600 for determining a power interruption event based on detected signal variation. In block 602, the electronic power supply device 150 monitors the grid power supply and generates a variation signal 159 in response to a grid power supply sensor 158 detecting a signal variation in the grid power 145 received from the grid power supply 144.

In block 604, a power interruption event is identified by determining that the variation signal 159 satisfies a predetermined threshold. The power controller 156 compares the variation signal 159 against a predetermined threshold stored in the electronic power supply device configuration 151. The predetermined threshold may be set or determined by an analysis of acceptable power line ripple voltages, or other factors. In block 606, the power interruption event is further identified when the power controller 156 determines that the power interruption event exceeds the threshold and is an excessive signal variation.

Figure 7:
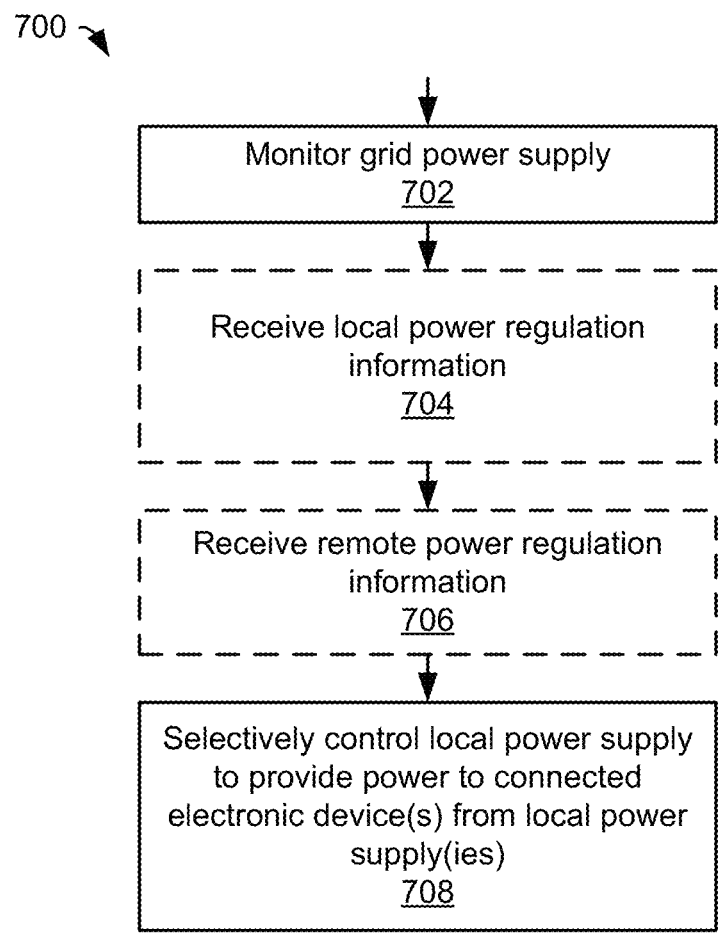
FIG. 7 is a flow diagram illustrating an example method for selectively controlling a local power supply.

FIG. 7 is a flow diagram illustrating an example method 700 for selectively controlling a local power supply.

In block 702, an electronic power supply device 150 monitors the grid power 145 received from the grid power supply 144. The determination of whether to switch from grid power to local power may be based upon power regulation information.

In block 704, the power regulation information may be locally received. In one example, electronic power supply device configuration 151 may be received via a network from a user device 104. The electronic power supply device configuration 151 may configure a parameter instructing the power controller 156 to transition to providing local power from the local power supply if a predetermined threshold is satisfied. The electronic power supply device configuration 151 may be stored in electronic power supply device 150.

In block 706, the power regulation information may be remotely received. In one example, the electronic power supply device configuration may be received via a network from a management server 122. The electronic power supply device configuration 151 may configure a parameter instructing the power controller 156 to transition to providing local power from the local power supply if a predetermined threshold is satisfied. The electronic power supply device configuration may configure a parameter instructing the power controller 156 to transition to providing local power from the local power supply if a predetermined threshold is satisfied. The electronic power supply device configuration may be stored in a memory 157.

In block 708, the electronic power supply device 150 selectively controls a local power supply to provide local power to the connected electronic devices. The selection of local power supply may be made using controllable relays 160 which are under the control of power controller 156.

Figure 8:
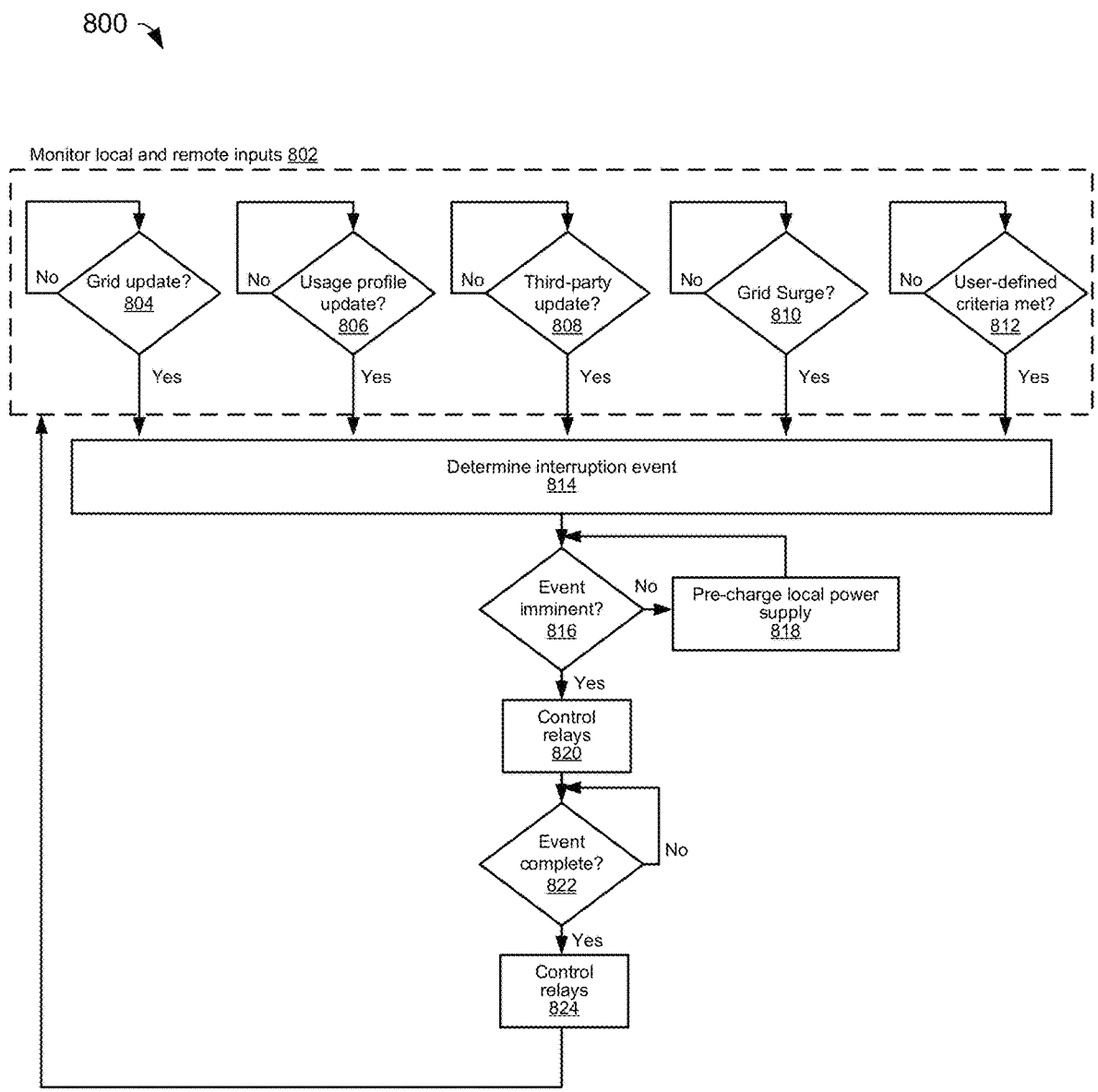
FIG. 8 is a flow diagram illustrating an example method for cloud-based mitigation of a power interruption event.

FIG. 8 is a flow diagram illustrating an example method 800 for cloud-based mitigation of a power interruption event. The method 800 may be performed in the cloud, such as by a management server 122. In block 802, a management server 122, using a power management application 124, may monitor local and remote inputs. In query process 804, a power management application 124 may receive grid updates from utility/industry partner 142. Such grid updates may include status, scheduled maintenance, anticipated outages, and other information that may be made available. When the grid updated information indicates an interruption, an interruption event may be determined in block 814.

In query process 806, a power management application 124 may receive a usage profile from an electronic power supply device 150. The usage profile may include power usage for one or more connected electronic devices 166. The usage information may include time of use, duration of use, and other information indicative of timing and power needs of electronic devices. When the usage profile information indicates an interruption, an interruption event may be determined in block 814.

In block 808, which may represent a query process, a power management application 124 may receive information from third-party data sources 126. The third-party data may include grid infrastructure reports 128, weather data 130, vegetation management data 132, energy pricing data 134, and other information that may be useful in identifying an interruption event. When the third-party information indicates an interruption, an interruption event may be determined in block 814.

In block 810, which may represent a query process, a power management application 124 may receive a variation signal 159 from the electronic power supply device 150. The generation of the variation signal 159 may be in response to a comparison with a threshold identifying the excessive change in a level of the grid power. When the grid search information indicates an interruption, an interruption event may be determined in block 814.

In block 812, which may represent a query process, a power management application 124 may receive user-defined criteria from a user device 104. The user-defined information may include one or more schedules identifying usage characteristics of one or more connected electronic devices 166. When the user-defined criteria indicate an interruption, an interruption event may be determined in block 814.

If in block 814 an interruption event is determined, the event may be determined imminent in block 816. If in block 816, the event is determined to not be imminent, the local power supply 154 may be pre-charged in anticipation of an interruption of the grid power in block 818. When the event is imminent, in block 820, a signal is sent to the electronic power supply device 150 to control the controllable relays 160.

If in block 822, the interruption event is determined to be incomplete, the control settings of the controllable relays 160 are maintained. If in block 822, it is determined that the interruption event is complete, a control signal is sent to the controllable relays 160 in block 824 to deactivate the controllable relays 160 in response to the end of the interruption event. Processing may then return to block 802 to monitor local and remote inputs.

Figure 9:
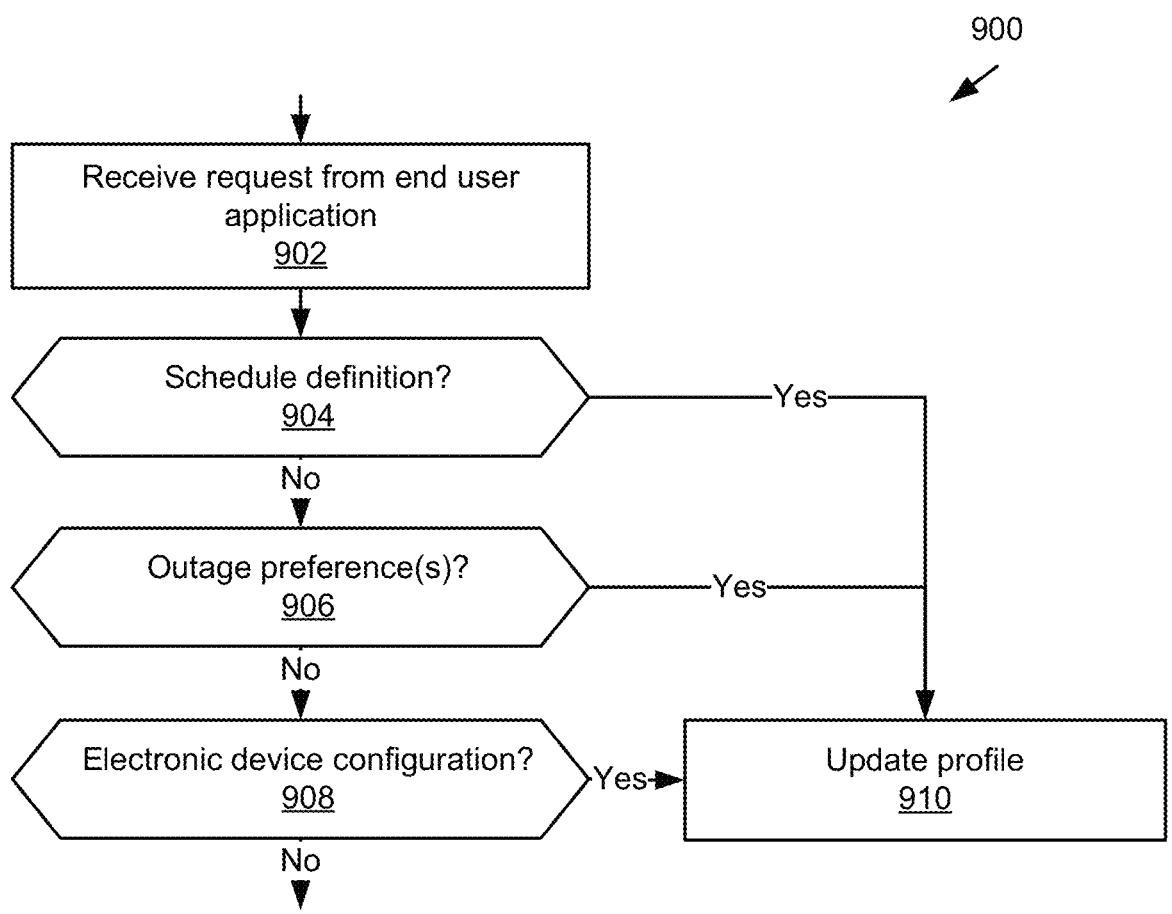
FIG. 9 is a flow diagram illustrating an example method for updating a profile.

FIG. 9 is a flow diagram illustrating an example method 900 for updating a profile. As shown, the method 900 may include process logic for a management server 122. In block 902, a power management application 124 receives a request from a user application 118 and a user device 104. The request may be to provide updates to the user profile, schedule, preferences, and device configurations. In block 904, when the request is for an update to the scheduled definition, then the user profile 125 is updated in block 910.

In block 906, when the request is for updating an outage preference, then in block 910 the user profile 125 is updated to include updates to the outage preference configuration. In block 908, when the request is for configuring or updating a configuration of electronic devices 166, then, in block 910, the user profile 125 is updated to include updates to the electronic power supply device configuration 151.

Figure 10:
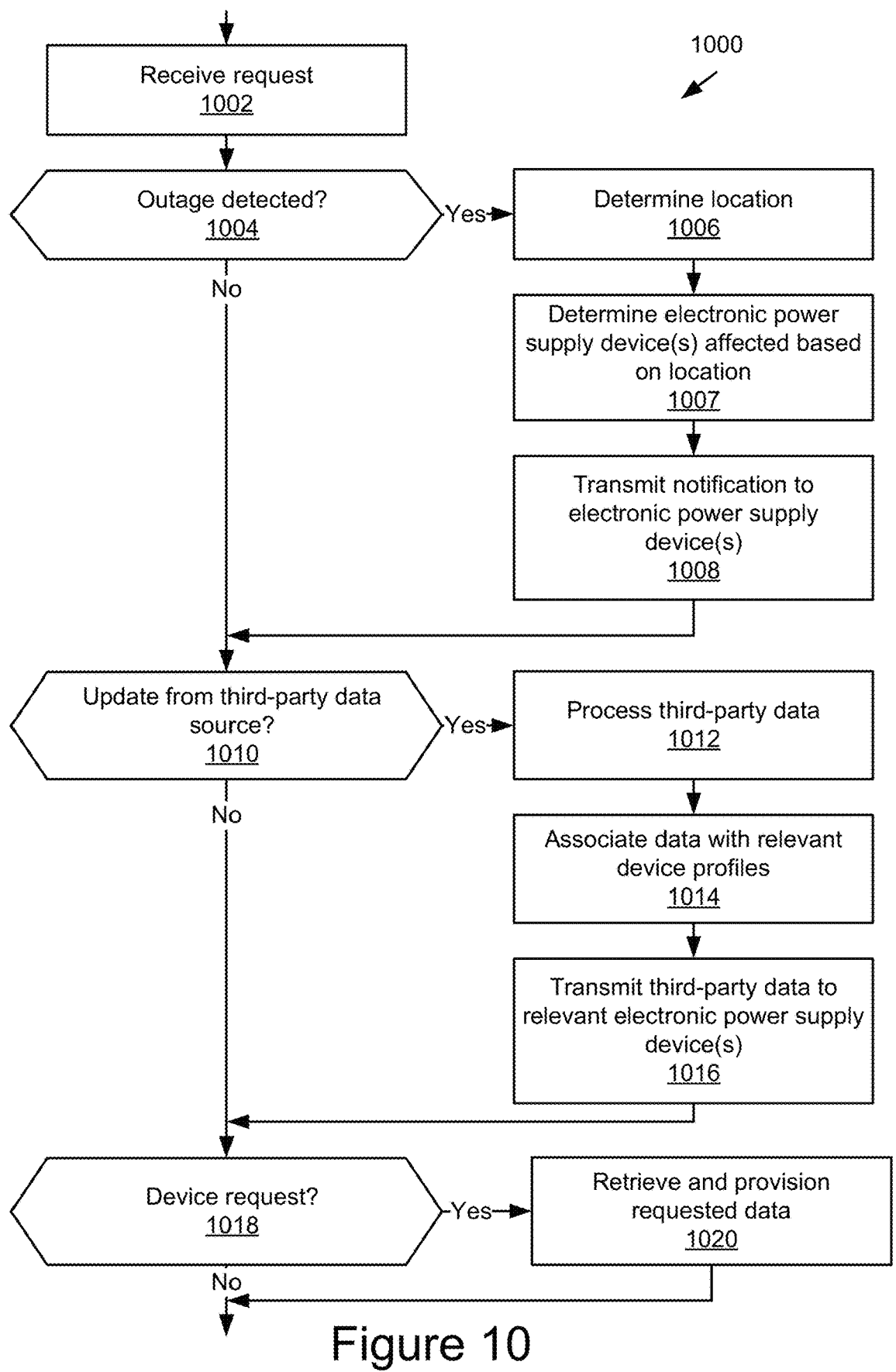
FIG. 10 is a flow diagram illustrating an example method for processing and providing data to power supply device(s).

FIG. 10 is a flow diagram illustrating an example method 1000 for processing and provisioning data. In block 1002, a power management application 124 receives a request for processing or data for provisioning a device, such as device 150. In block 1004, if an outage is detected as indicated by the request, then in block 1006, one of a management server 122, an electronic power supply device 150, or a user device 104 determines a location of the outage. Further, in block 1007, one of a management server 122, an electronic power supply device 150, or a user device 104 determines which electronic devices 166 are affected by the outage based at the location. In response to the location of the outage, in block 1008, one of a management server 122, an electronic power supply device 150, or a user device 104 transmits a notification of the outage to the electronic power supply device 150.

In block 1010, one of a management server 122, an electronic power supply device 150, or a user device 104 determines if the received request is an update from a third-party data source. When the request is for an update from a third-party data service, in block 1012, one of a management server 122, an electronic power supply device 150, or a user device 104 processes the third-party data. In block 1014, one of a management server 122, an electronic power supply device 150, or a user device 104 associates the data with the relevant device profiles. In block 1016, one of a management server 122, an electronic power supply device 150, or a user device 104 transmits the third-party data to the relevant electronic power supply device 150. In block 1018, one of a management server 122, an electronic power supply device 150, or a user device 104 determines if the request was a query for a specific device. When the request was for a specific device, in block 1020, one of a management server 122, an electronic power supply device 150, or a user device 104 retrieves provisioning data.

Figure 11A:
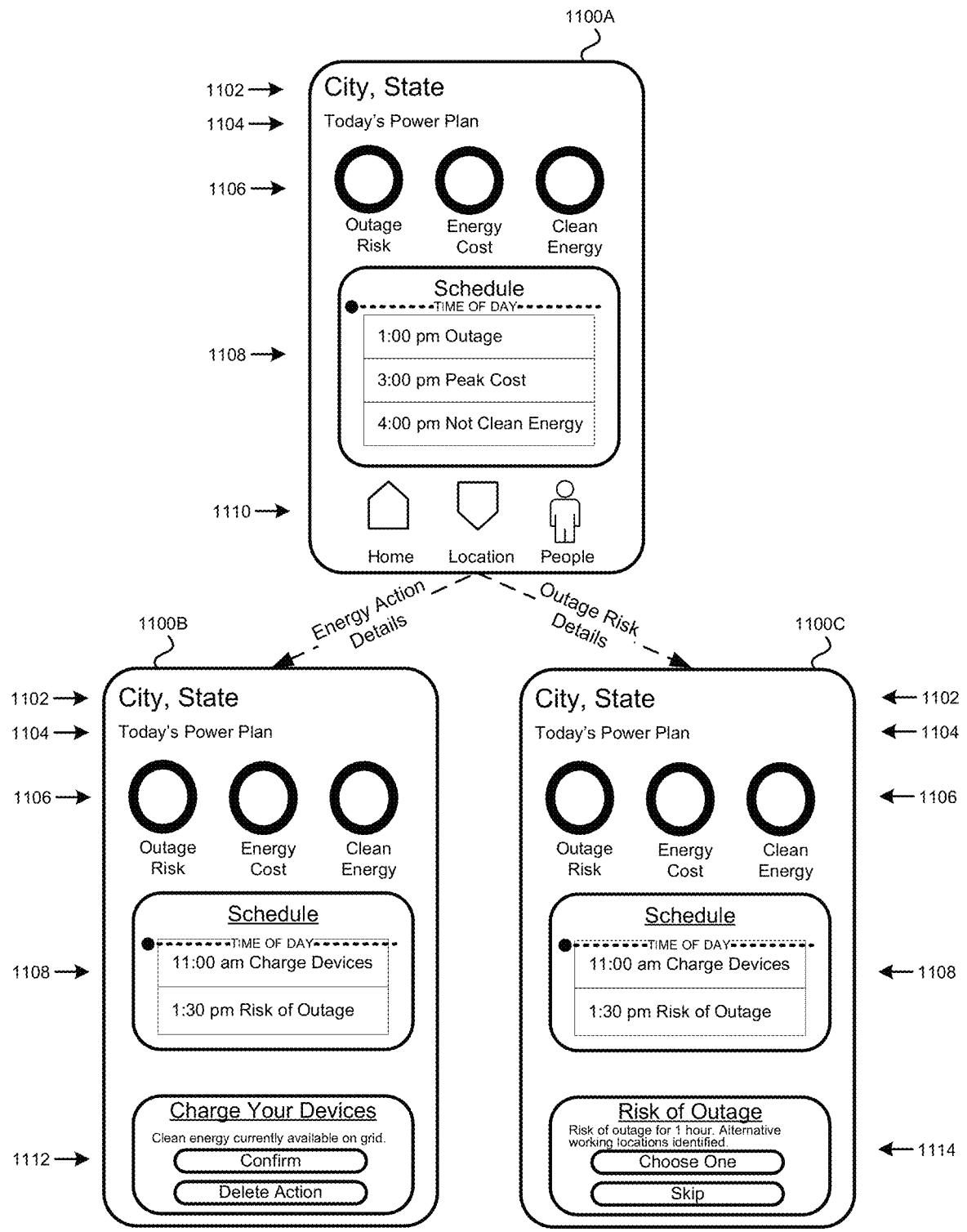
FIG. 11A illustrates example user interfaces for managing outage mitigation.

FIG. 11A illustrates example user interfaces 1100A, 1100B, and 1100C for managing outage mitigation. Interfaces 1100A, 1100B, and 1100C may be displayed on a user device 104 by a user application 118. The various interfaces may provide various statuses and selection options. For example, a location indicator 1102 may identify a current location of the user device 104. Further, an indicator 1104 may identify a specific plan that is displayed to the user. Selection buttons 1106 may enable a user to navigate through various display options. Selection buttons 1106 may also provide status information therein. Interface 1100 may also include a status field 1108 which may provide a listed schedule. Interface 1100 may also include navigation buttons 1110 for allowing a user to further navigate interface 1100.

A user may navigate away from interface 1100A to interface 1100B where energy action details may be displayed. As illustrated in interface 1100B, the user application 118 anticipates a forthcoming outage and provides a query field 1112 to notify the user to begin charging connected electronic devices 166 using currently available grid power 145. The user application 118 may also, in anticipation of a forthcoming outage, begin or further charge the local power supply 154. While a single query field 1112 has been illustrated, multiple or nested query fields may also be utilized.

The user may navigate away from interface 1100A where outage risk details may be displayed. As illustrated in interface 1100C, the user application 118 anticipates a forthcoming outage and provides a query field 1114 notifying a user of the forthcoming outage and of identified alternative non-outage locations where a user may continue activities without a known power outage. When a single query field 1114 has been illustrated, multiple or nested query fields may also be utilized.

Figure 11B:
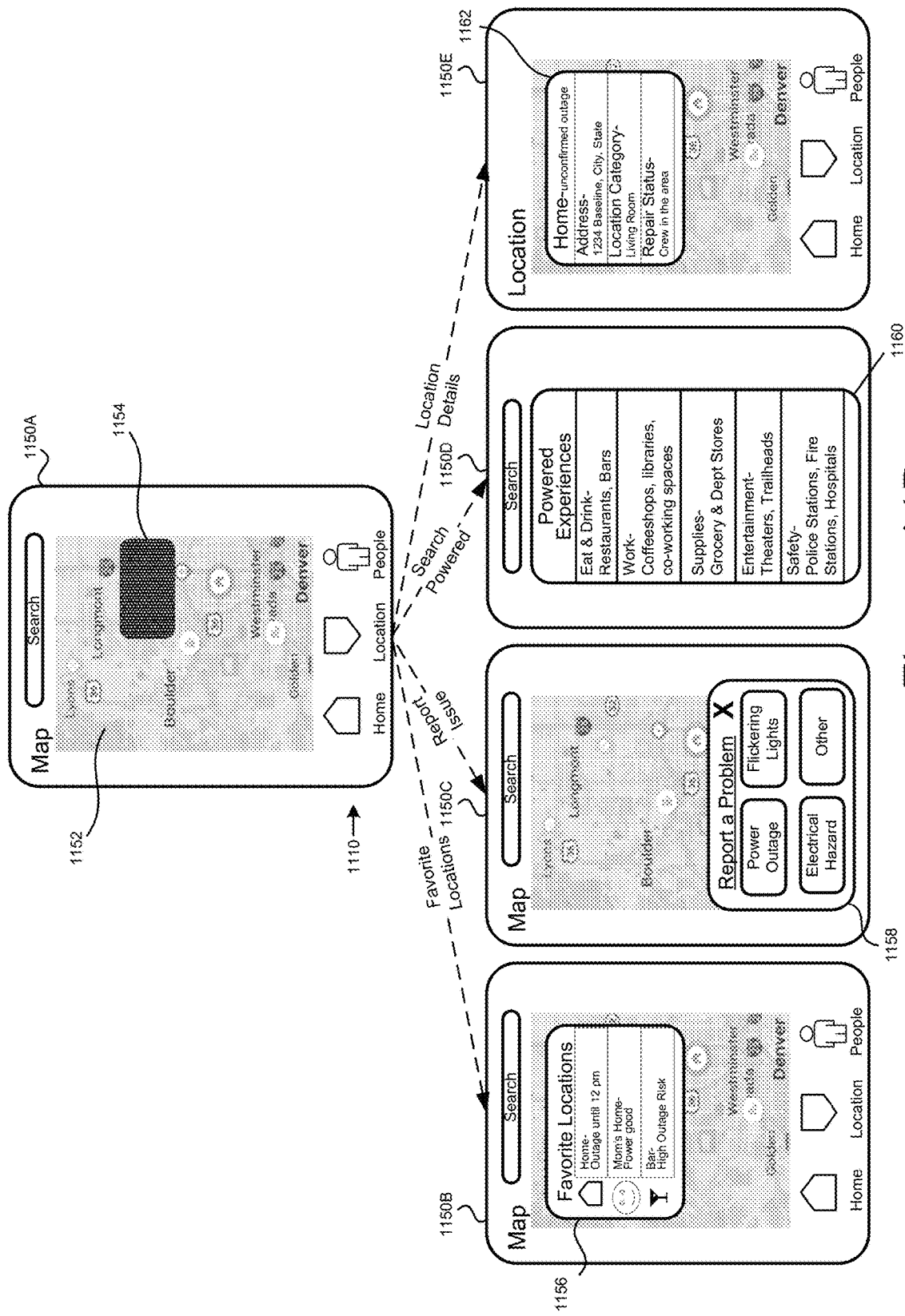
FIG. 11B illustrates example user interfaces for managing location alternatives and statuses during power outages.

FIG. 11B illustrates example user interfaces 1150A, 1150B, 1150C, 1150D, and 1150E for managing location alternatives and statuses during power outages. Interfaces 1150A, 1150B, 1150C, 1150D, and 1150E may be displayed on a user device 104 by a user application 118. The various interfaces may provide various statuses and selection options. For example, interface 1150 may display a portion of a map 1152. The map 1152 may also have displayed thereon and outage region 1154. Further, interface 1150 may also include navigation buttons 1110.

From interface 1150A, a user may navigate to one or more of interfaces 1150B-1150E. For example, a user may navigate from interface 1150A to interface 1150B to obtain the status of various favorite locations known to the user. Interface 1150B may include a status field 1156 listing a user's favorite locations and providing a status of the power at the respective locations.

From interface 1150A, a user may navigate to interface 1150C to report a power-related issue. Interface 1150C may include a query field 1158 allowing a user to select one or more observed power issues that may then be reported back to the power management application 124.

From interface 1150A, a user may navigate to interface 1150D to locate categories of places where outages are not occurring. Interface 1150D may include a status field 1160 identifying various categories of places where a user may search for locations and determine their current outage status.

From interface 1150A, a user may navigate to the interface 1150E to determine the outage status at a particular location. Interface 1150E may include a status field 1162 which may identify a location by a specific address, and further identify areas within that location and receive status regarding the specific areas. Other statuses may also be displayed such as a repair status designating the current state of repair.

Figure 12A:
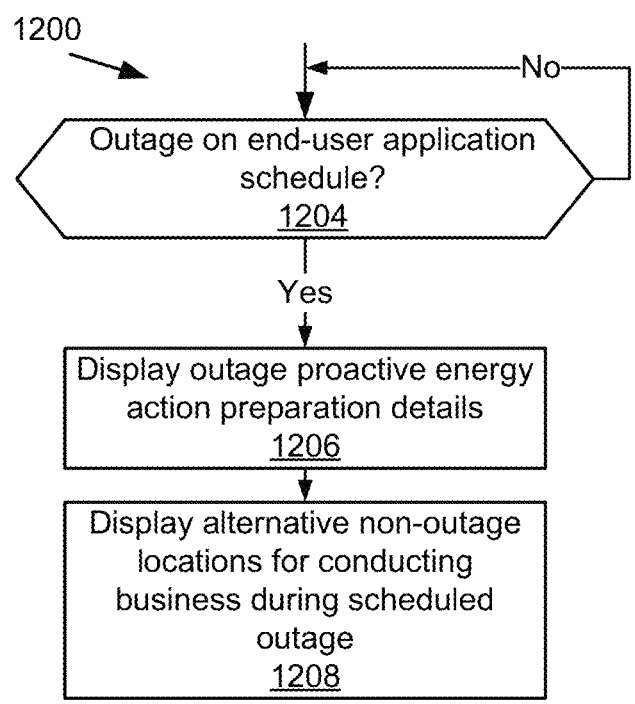
FIG. 12A is a flow diagram illustrating an example outage mitigation management process.

FIG. 12A is a flow diagram illustrating an outage mitigation management process 1200, which corresponds with the various interfaces of FIG. 11A. In block 1204, an end-user application 118 identifies the presence of an outage on a user application schedule. When an outage is scheduled, in block 1206, the end-user application 118 displays a query field allowing the user to be proactive in preparing for the outage specifically, the user may charge or pre-charge the connected electronic devices 166. Further, the user may select to charge the local power supply 154 in anticipation of an outage. Outage mitigation may occur by preemptively charging, prior to an occurrence of the identified power interruption event, the local power supply of the electronic power supply device to a level sufficient to power one or more apparatuses electrically coupled to the electronic power supply device for one of a user-configured period of time or a period of time estimated as needed to restore the grid power supply. In block 1208, the end-user application 118 displays in the interface a query field allowing a user to select alternative non-outage locations for conducting business during a scheduled outage.

Figure 12B:
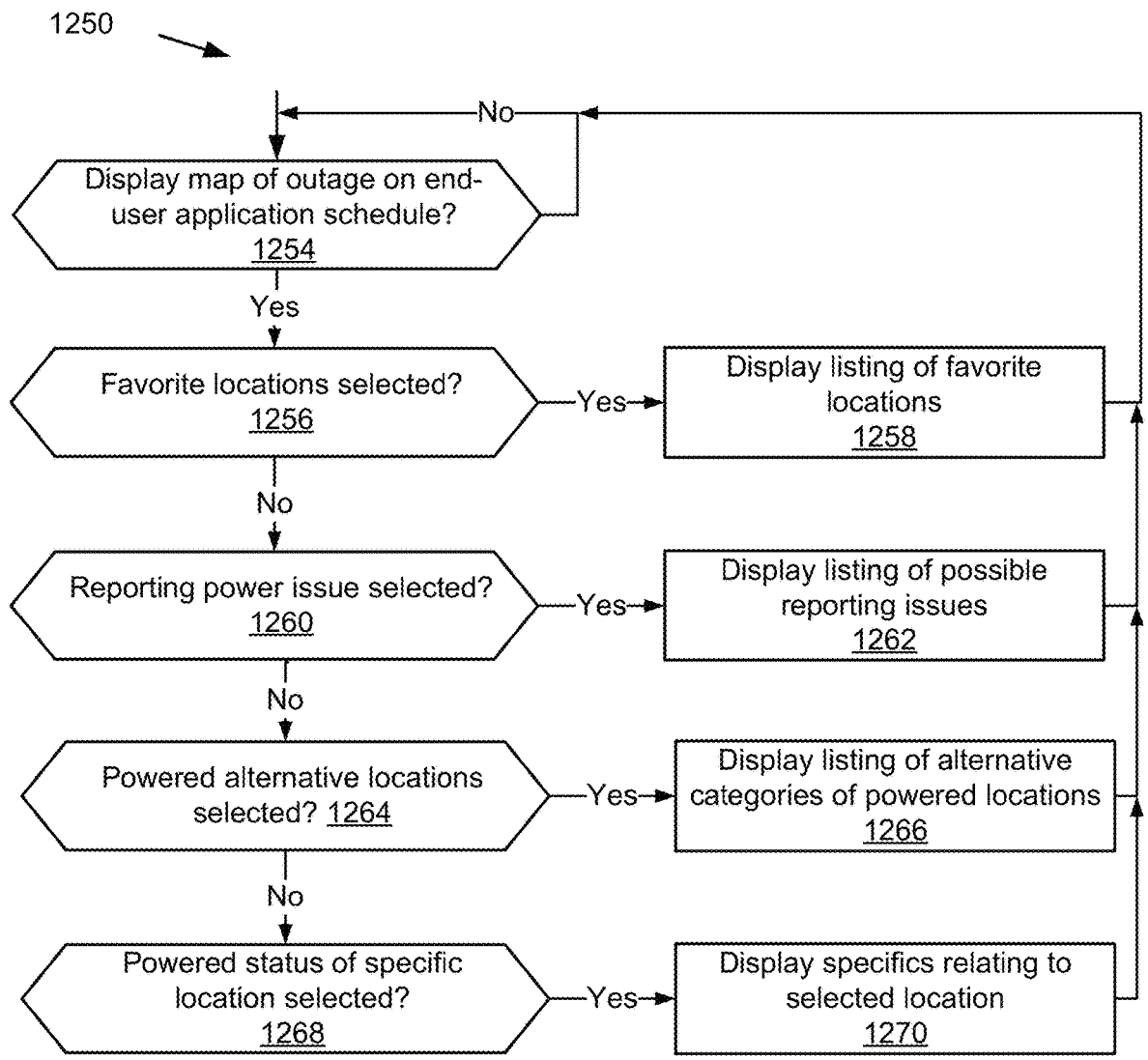
FIG. 12B is a flow diagram illustrating an example status management process.

FIG. 12B is a flow diagram illustrating outage location alternatives and status management process 1250, which corresponds with the various interfaces of FIG. 11B. In block 1254, the end-user application 118 determines if a map of the scheduled outage is displayed on the end-user application. When the map is displayed, a user may navigate to various other interfaces as described above with respect to FIG. 11B. In block 1256, the user may select block 1258 to instruct the end-user application to display a listing of favorite locations. As described, the favorite locations may provide a power outage status for each of the locations. In block 1260, the user may select block 1262 to instruct the end-user application to display a listing of possible reporting issues. In block 1264, the user may select block 1266 to instruct the end-user application 118 to display a listing of alternative categories of powered locations. In block 1268, the user may select block 1270 to instruct the end-user application to display specifics related to a specific location.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

It should be understood that various aspects of the present technology may be embodied as a system, method, or computer program product. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing.

Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any suitable programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A method, comprising:
   determining power regulation data including generating a variation signal from a grid power supply sensor in response to detecting a signal variation in a grid power supply;
   identifying a power interruption event determined to disrupt operation of an electronic device powered by the grid power supply based on the power regulation data, wherein identifying the power interruption event includes:
      determining that the variation signal satisfies a predetermined threshold; and
      determining the power interruption event to be an excessive signal variation; and
   mitigating the identified power interruption event by causing an electronic power supply device to transition from receiving power from the grid power supply to receiving power from a local power supply, the electronic device being electrically coupled to the electronic power supply device.

2. The method of claim 1, wherein:
   the power regulation data includes historical power generation information; and
   the method further comprises:
      receiving the historical power generation information;
      monitoring a state associated with the electronic power supply device; and
      identifying the power interruption event includes predicting the power interruption event based on the historical power generation information and the monitored state associated with the electronic power supply device.

3. The method of claim 1, wherein identifying the power interruption event includes:
   performing a comparison between the power regulation data and one or more event prediction criteria and determining the power interruption event based on the comparison; or
   predicting, using machine learning logic, the power interruption event based on one or more features included in the power regulation data.

4. The method of claim 3, wherein the power regulation data includes one or more of:
   household information reflecting a condition of an electrical infrastructure of a household to which the electronic power supply device is electrically coupled;
   weather information for a location associated with the grid power supply;
   grid infrastructure state information reflecting an infrastructure state of the grid power supply; and
   third-party information reflecting one or more of grid power pricing data and vegetation management data.

5. The method of claim 4, wherein determining the power regulation data includes receiving the power regulation data from a remote server via a network.

6. The method of claim 1, wherein:
   determining the power interruption event includes analyzing a current waveform of the grid power supply.

7. The method of claim 1, further comprising:
   receiving, via a network from a computing device of a user, an electronic power supply device configuration for setting a parameter instructing a controller of the electronic power supply device to transition to the local power supply if a predetermined threshold is satisfied; and
   storing, in a memory of the electronic power supply device, the electronic power supply device configuration.

8. The method of claim 7, wherein the electronic power supply device configuration comprises a user-defined power transition schedule.

9. The method of claim 1, further comprising:
   preemptively charging, prior to an occurrence of the identified power interruption event, the local power supply of the electronic power supply device to a level sufficient to power one or more apparatuses electrically coupled to the electronic power supply device for one of a user-configured period of time or a period of time estimated as needed to restore the grid power supply.

10. The method of claim 9, wherein causing the electronic power supply device to transition includes causing a relay to switch the electronic power supply device from receiving the power from the grid power supply to receiving the power from the local power supply.

11. A system, comprising:
   a memory including executable instructions; and
   a processor configured to execute the executable instructions to cause the system to:

determine power regulation data including generating a variation signal from a grid power supply sensor in response to detecting a signal variation in a grid power supply;

identify a power interruption event determined to disrupt operation of an electronic device powered by the grid power supply based on the power regulation data, wherein identifying the power interruption event includes:
- determining that the variation signal satisfies a predetermined threshold; and
- determining the power interruption event to be an excessive signal variation; and mitigate the identified power interruption event by causing an electronic power supply device to transition from receiving power from the grid power supply to receiving power from a local power supply, the electronic device being electrically coupled to the electronic power supply device.

12. The system of claim 11, wherein:
the power regulation data includes historical power generation information; and
the system is further configured to:
- receive the historical power generation information;
- monitor a state associated with the electronic power supply device; and
- identify the power interruption event includes predicting the power interruption event based on the historical power generation information and the monitored state associated with the electronic power supply device.

13. The system of claim 11, wherein to identify the power interruption event includes the processor configured to:
- perform a comparison between the power regulation data and one or more event prediction criteria and determining the power interruption event based on the comparison; or
- predict, using machine learning logic, the power interruption event based on one or more features included in the power regulation data.

14. The system of claim 13, wherein the power regulation data includes one or more of:
- household information reflecting a condition of an electrical infrastructure of a household to which the electronic power supply device is electrically coupled;
- weather information for a location associated with the grid power supply;
- grid infrastructure state information reflecting an infrastructure state of the grid power supply; and
- third-party information reflecting one or more of grid power pricing data and vegetation management data.

15. The system of claim 14, wherein to determine the power regulation data includes to receive the power regulation data from a remote server via a network.

16. The system of claim 11, wherein the processor is configured to:
determine the power interruption event including analyzing a current waveform of the grid power supply.

17. The system of claim 11, wherein the processor is further configured to:
- receive, via a network from a computing device of a user, an electronic power supply device configuration for setting a parameter instructing a controller of the electronic power supply device to transition to the local power supply if a predetermined threshold is satisfied; and
- store, in a memory of the electronic power supply device, the electronic power supply device configuration.

18. The system of claim 17, wherein the electronic power supply device configuration comprises a user-defined power transition schedule.

19. The system of claim 11, wherein the processor is further configured to:
preemptively charge, prior to an occurrence of the identified power interruption event, the local power supply of the electronic power supply device to a level sufficient to power one or more apparatuses electrically coupled to the electronic power supply device for one of a user-configured period of time or a period of time estimated as needed to restore the grid power supply.

20. The system of claim 19, wherein to cause the electronic power supply device to transition includes causing a relay to switch the electronic power supply device from receiving the power from the grid power supply to receiving the power from the local power supply.

21. A system, comprising:
means for determining power regulation data including generating a variation signal from a grid power supply sensor in response to detecting a signal variation in a grid power supply;

means for identifying a power interruption event determined to disrupt operation of an electronic device powered by the grid power supply based on the power regulation data, wherein identifying the power interruption event includes:
- determining that the variation signal satisfies a predetermined threshold; and
- determining the power interruption event to be an excessive signal variation; and means for mitigating the identified power interruption event by causing an electronic power supply device to transition from receiving power from the grid power supply to receiving power from a local power supply, the electronic device being electrically coupled to the electronic power supply device.

* * * * *